(12) United States Patent
Makino

(10) Patent No.: US 11,763,069 B2
(45) Date of Patent: Sep. 19, 2023

(54) COMPUTER-READABLE RECORDING MEDIUM STORING LEARNING PROGRAM, LEARNING METHOD, AND LEARNING DEVICE

(71) Applicant: FUJITSU LIMITED, Kawasaki (JP)

(72) Inventor: Takuya Makino, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/500,965

(22) Filed: Oct. 14, 2021

(65) Prior Publication Data

US 2022/0198131 A1 Jun. 23, 2022

(30) Foreign Application Priority Data

Dec. 21, 2020 (JP) ................................. 2020-211633

(51) Int. Cl.
| | |
|---|---|
| G06F 40/166 | (2020.01) |
| G06N 3/08 | (2023.01) |
| G06F 18/10 | (2023.01) |
| G06F 18/211 | (2023.01) |

(52) U.S. Cl.
CPC ............ G06F 40/166 (2020.01); G06F 18/10 (2023.01); G06F 18/211 (2023.01); G06N 3/08 (2013.01)

(58) Field of Classification Search
CPC ....... G06N 3/08; G06F 40/166; G06F 18/211; G06F 18/10; G06K 9/6228; G06K 9/6298
See application file for complete search history.

(56) References Cited

U.S. PATENT DOCUMENTS

| | | | | |
|---|---|---|---|---|
| 11,386,272 | B2* | 7/2022 | Makino | G06F 40/242 |
| 11,454,976 | B1* | 9/2022 | Levinson | G05D 1/0251 |
| 2019/0155877 | A1* | 5/2019 | Sharma | G06F 40/151 |
| 2019/0251172 | A1 | 8/2019 | Jezewski | |
| 2020/0242197 | A1* | 7/2020 | Srinivasan | G06F 40/284 |

(Continued)

FOREIGN PATENT DOCUMENTS

JP 2004-253011 A 9/2004

OTHER PUBLICATIONS

Matsumaru et al., "Improving Truthfulness of Headline Generation", Proceedings of the 58th Annual Meeting of the Association for Computational Linguistics, arXiv:2005.00882,2020, Jul. 5-10, 2020, pp. 1335-1346.

*Primary Examiner* — Scott T Baderman
*Assistant Examiner* — Mario M Velez-Lopez
(74) *Attorney, Agent, or Firm* — XSENSUS LLP

(57) ABSTRACT

A non-transitory computer-readable recording medium storing a learning program that causes a computer to execute a process, a process includes acquiring a first input sentence and a first summary sentence into which the first input sentence is summarized, generating a second summary sentence to which the first summary sentence is partially-changed, and executing machine learning for a model to generate at least one summary sentence that corresponds to at least one input sentence, respectively, in response to an input of the at least one input sentence, such that a first probability of generating the first summary sentence in response to the input of the first input sentence becomes higher than a second probability of generating the second summary sentence in response to the input of the first input sentence, based on the first input sentence, the first summary sentence, and the second summary sentence.

9 Claims, 13 Drawing Sheets

(56) References Cited

U.S. PATENT DOCUMENTS

| | | | | |
|---|---|---|---|---|
| 2020/0342019 A1* | 10/2020 | Manba | ................... | G06F 16/93 |
| 2020/0364403 A1* | 11/2020 | Choi | ................... | G06F 40/284 |
| 2021/0042391 A1* | 2/2021 | Gehrmann | ............ | G06N 3/048 |
| 2022/0067284 A1* | 3/2022 | He | ...................... | G06F 16/345 |
| 2022/0138239 A1* | 5/2022 | Saito | ..................... | G06N 3/044 |
| | | | | 704/9 |
| 2022/0138438 A1* | 5/2022 | Saito | ..................... | G06F 40/30 |
| | | | | 704/9 |
| 2022/0171926 A1* | 6/2022 | Iwakura | ................ | G06N 3/044 |
| 2022/0351071 A1* | 11/2022 | Li | ....................... | G06N 3/0985 |

\* cited by examiner

FIG. 5

| ATTRIBUTE | WORD |
|---|---|
| ORGANIZATION NAME | COMPANY A |
| ORGANIZATION NAME | COMPANY C |
| ... | ... |

500
500-1

US 11,763,069 B2

COMPUTER-READABLE RECORDING MEDIUM STORING LEARNING PROGRAM, LEARNING METHOD, AND LEARNING DEVICE

CROSS-REFERENCE TO RELATED APPLICATION

This application is based upon and claims the benefit of priority of the prior Japanese Patent Application No. 2020-211633, filed on Dec. 21, 2020, the entire contents of which are incorporated herein by reference.

FIELD

The embodiments discussed herein are related to a learning program, a learning method, and a learning device.

BACKGROUND

In the past, a model for generating a summary sentence corresponding to an input sentence has been learned using training data including an input sentence and a summary sentence as a correct answer.

For example, there is an existing technique of removing training data including a summary sentence inappropriate as a correct answer from prepared training data, using an implication relationship recognition model, and learning a model for generating a summary sentence corresponding to an input sentence, using the remaining training data.

Kazuki Matsumaru, Sho Takase, and Naoaki Okazaki. "Improving Truthfulness of Headline Generation." *Proceedings of the 58th Annual Meeting of the Association for Computational Linguistics* is disclosed as related art.

SUMMARY

According to an aspect of the embodiments, a non-transitory computer-readable recording medium storing a learning program that causes a computer to execute a process, the process includes acquiring a first input sentence and a first summary sentence into which the first input sentence is summarized, generating a second summary sentence to which the first summary sentence is partially-changed, and executing machine learning for a model to generate at least one summary sentence that corresponds to at least one input sentence, respectively, in response to an input of the at least one input sentence, such that a first probability of generating the first summary sentence in response to the input of the first input sentence becomes higher than a second probability of generating the second summary sentence in response to the input of the first input sentence, based on the first input sentence, the first summary sentence, and the second summary sentence.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is an explanatory diagram illustrating an example of content stored in a word data management table 500;

DESCRIPTION OF EMBODIMENTS

With a conventional technique, learning a model capable of accurately generating a summary sentence is difficult. For example, even if an implication relationship recognition model is used, training data including a summary sentence inappropriate as a correct answer is not able to be completely removed from prepared training data, and a model that generates an inappropriate summary sentence is sometimes learned.

Hereinafter, an embodiment of a technique that enables learning of a model capable of accurately generating a summary sentence will be described in detail with reference to the drawings.

Example of Learning Method According to Embodiment

Figure 1:
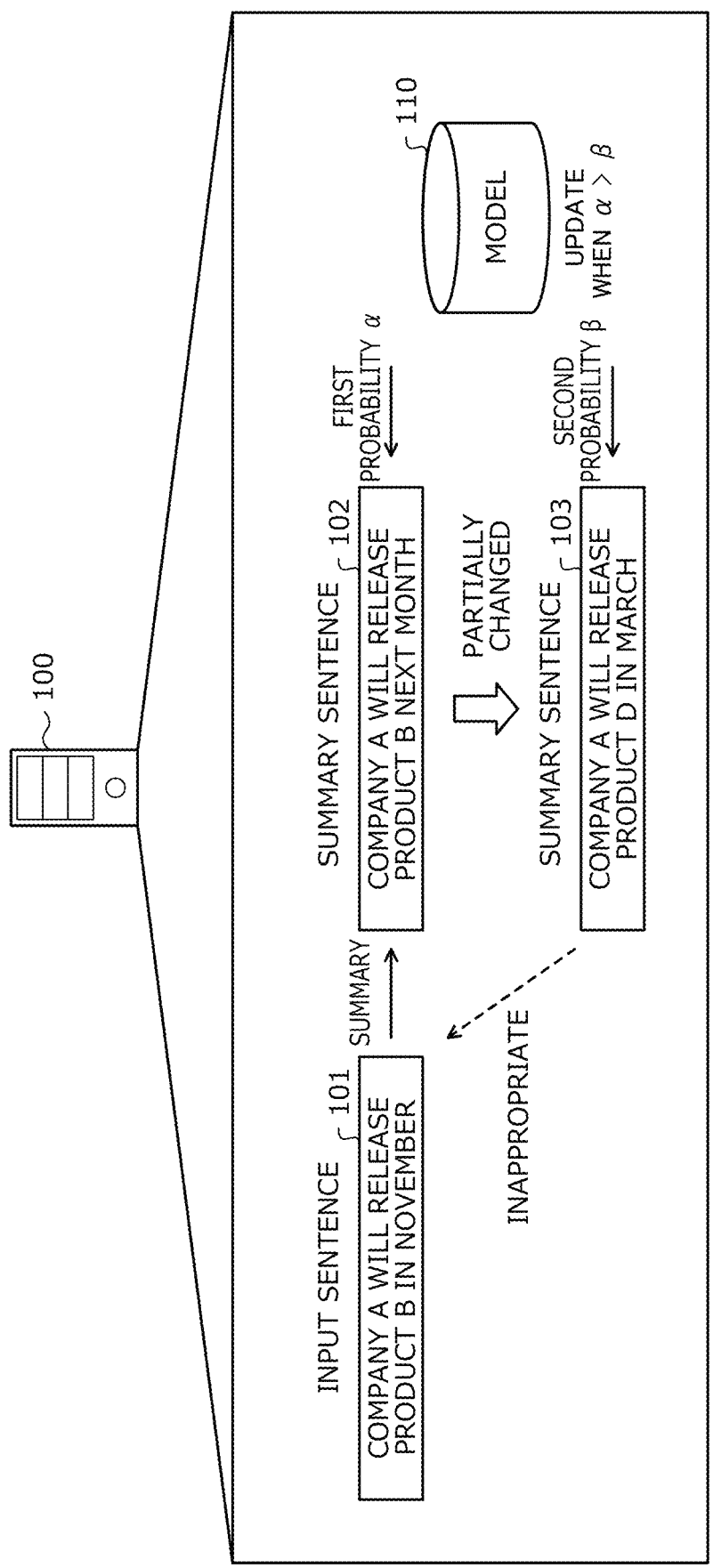
FIG. 1 is an explanatory diagram illustrating an example of a learning method according to an embodiment.

FIG. 1 is an explanatory diagram illustrating an example of a learning method according to an embodiment. A learning device 100 is a computer for learning a model capable of accurately generating a summary sentence corresponding to an input sentence. The summary sentence is, for example, a sentence summarizing content, a point of an argument, a main point, or the like of the input sentence.

In the past, learning a model capable of accurately generating a summary sentence has been difficult. For example, a method of preparing a plurality of training data, each of which includes an input sentence and a summary sentence as a correct answer, and then learning a model for generating a summary sentence corresponding to an input sentence using the plurality of training data is conceivable.

In this method, there may be a case in which training data including a summary sentence inappropriate as a correct answer among the prepared training data is present and, thus, the model capable of accurately generating a summary sentence may not be learned.

For the problem, for example, a method of removing the training data including a noise using an implication relationship recognition model for recognizing a semantic inclusion relationship between two texts is conceivable. Specifically, a method of removing the training data including a summary sentence inappropriate as a correct answer from the prepared training data with use of the implication relationship recognition model and learning the model for generating a summary sentence corresponding to an input sentence, using the remaining training data is conceivable. Here, it is conceivable that the summary sentence inappropriate as a correct answer is determined on the basis of an implication relationship between the input sentence and the summary sentence.

Even with this method, learning the model capable of accurately generating a summary sentence is difficult. For example, there may be a case in which the training data including a summary sentence inappropriate as a correct answer may not be completely removed from among the prepared training data and, thus, the model capable of accurately generating a summary sentence may not be learned. Furthermore, for example, there may be a case in which the training data including a summary sentence inappropriate as a correct answer, which has not been removed and remains, is mistakenly treated as training data including a summary sentence appropriate as a correct answer and, thus, the model capable of accurately generating a summary sentence may not be learned.

Therefore, in the present embodiment, a learning method capable of learning a model capable of accurately generating a summary sentence corresponding to an input sentence will be described.

(1-1) The learning device 100 acquires a first input sentence 101 and a first summary sentence 102 that summarizes the first input sentence 101. The learning device 100 acquires, for example, by receiving, the first input sentence 101 and the first summary sentence 102 that summarizes the first input sentence 101 from another computer. For example, the learning device 100 may acquire the first input sentence 101 and the first summary sentence 102 that summarizes the first input sentence 101 on the basis of an operation input of a user.

(1-2) The learning device 100 generates a second summary sentence 103 that is a partially-changed version of the acquired first summary sentence 102 (that is partially similar to the first summary sentence 102). The learning device 100 generates the second summary sentence 103 by, for example, detecting a word of a predetermined type from the acquired first summary sentence 102 and replacing the detected word with another word of the same type. Alternatively, the learning device 100 generates the second summary sentence 103 by searching another training data for a summary sentence partially matching the first summary sentence, using a sentence in which the acquired first summary sentence is partially hidden as a search condition. According to this process, the learning device 100 generates the second summary sentence 103 inappropriate as a correct answer. Therefore, the learning device 100 evaluates a model 110 that generates a summary sentence corresponding to an input sentence in response to an input of the input sentence from a viewpoint different from the first summary sentence 102.

(1-3) The learning device 100 learns the model 110 that generates a summary sentence corresponding to an input sentence in response to the input of the input sentence on the basis of the acquired first input sentence 101, the acquired first summary sentence 102, and the generated second summary sentence 103. The learning is implemented by error backpropagation, using, for example, a loss function. The learning device 100 leans the model 110 such that a first probability $\alpha$ of generating the first summary sentence 102 in response to the input of the first input sentence 101 becomes higher than a second probability $\beta$ of generating the second summary sentence 103 in response to the input of the first input sentence 101, for example.

(1-4) The learning device 100 generates a summary sentence corresponding to a target input sentence, using the learned model 110. The learning device 100 may output the learned model 110. The learning device 100 transmits, for example, the learned model 110 to another computer.

Thereby, the learning device 100 learns the model 110 capable of accurately generating the summary sentence corresponding to the input sentence. Furthermore, the learning device 100 accurately generates the summary sentence corresponding to a target input sentence, using the learned model 110. Furthermore, the learning device 100 makes the learned model 110 available to other computers.

Example of Information Processing System 200

Next, an example of an information processing system 200 to which the learning device 100 illustrated in FIG. 1 is applied will be described with reference to FIG. 2.

Figure 2:
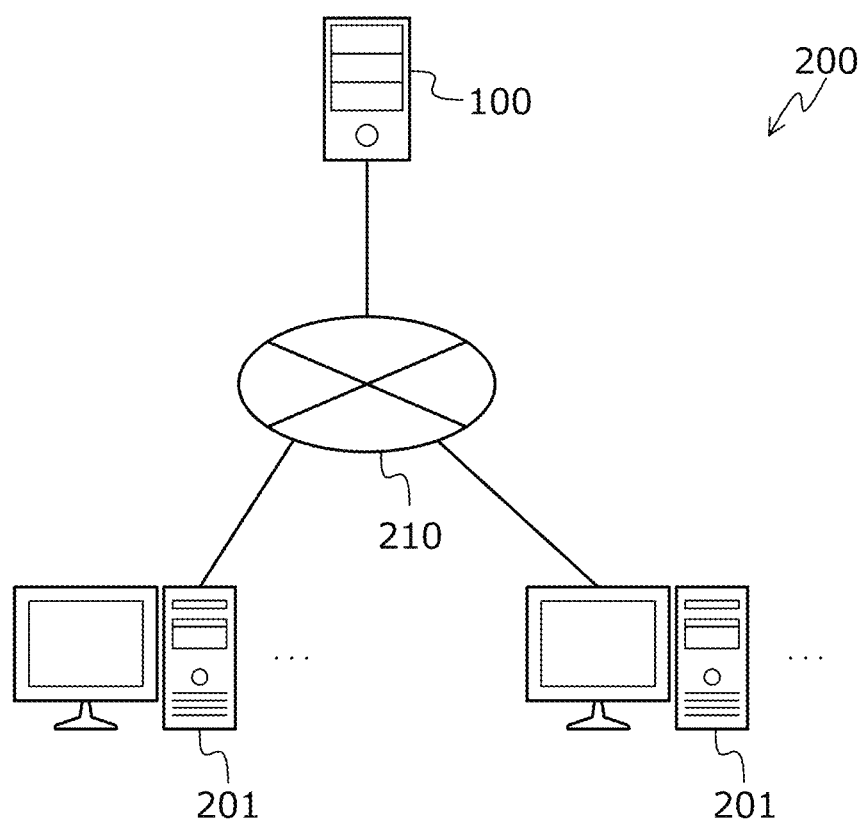
FIG. 2 is an explanatory diagram illustrating an example of an information processing system 200.

FIG. 2 is an explanatory diagram illustrating an example of the information processing system 200. In FIG. 2, the information processing system 200 includes the learning device 100 and a client device 201.

In the information processing system 200, the learning device 100 and the client device 201 are connected via a wired or wireless network 210. The network 210 is, for example, a local area network (LAN), a wide area network (WAN), the Internet, or the like.

The learning device 100 is a computer used by a system administrator. The learning device 100 stores training data including an input sentence and a summary sentence that summarizes the input sentence. The training data is prepared by, for example, the system administrator. The training data is stored using, for example, a training data management table 400 to be described below in FIG. 4.

The learning device 100 generates an inappropriate summary sentence by partially changing the summary sentence included in the training data. Alternatively, the learning device 100 generates an inappropriate summary sentence by searching another training data for a summary sentence partially matching the summary sentence included in the training data. The inappropriate summary sentence is stored using, for example, the training data management table 400 to be described below in FIG. 4. The learning device 100 learns a model that generates a summary sentence corresponding to an input sentence in response to an input of the input sentence on the basis of the training data and the generated inappropriate summary sentence.

The learning device 100 acquires a target input sentence of which a summary sentence is to be generated. The learning device 100 acquires, by receiving, the target input sentence from the client device 201, for example. The learning device 100 generates a summary sentence corresponding to the target input sentence, using the learned model. The learning device 100 outputs the summary sentence corresponding to the target input sentence. The learning device 100 transmits, for example, the summary sentence corresponding to the target input sentence to the client device 201. The learning device 100 is, for example, a server, a personal computer (PC), or the like.

The client device 201 is a computer used by a system user. The client device 201 transmits the target input sentence of which a summary sentence is to be generated to the learning device 100. For example, the client device 201 acquires the target input sentence of which a summary sentence is to be generated on the basis of an operation input by the system user, and transmits the target input sentence to the learning device 100. The client device 201 receives the summary sentence corresponding to the target input sentence from the learning device 100. The client device 201 outputs the summary sentence corresponding to the target input sentence in such a manner that the system user refers to the summary sentence. Examples of the client device 201 include a PC, a tablet terminal, a smartphone, and the like.

Here, a case in which the learning device 100 and the client device 201 are different devices has been described. However, the embodiment is not limited to the case. For example, the learning device 100 may have a function as the client device 201. In this case, the information processing system 200 may not include the client device 201.

Use Example 1 of Information Processing System 200

The information processing system 200 is used for implementing an article editing support system, for example. Here, it is assumed that the system user wants to generate a summary sentence that summarizes an article, for example. Specifically, it is assumed that the system user wants to generate a summary sentence that summarizes an article and adopts the summary sentence as a headline of the article.

The learning device 100 stores training data including an input article and a summary sentence that summarizes the input article. The learning device 100 generates an inappropriate summary sentence by partially changing the summary sentence that summarizes the input article. The learning device 100 learns a model that generates a summary sentence corresponding to an input article in response to an input of the input article on the basis of the training data and the generated inappropriate summary sentence.

The client device 201 transmits the target input article of which a summary sentence is to be generated to the learning device 100. The learning device 100 generates a summary sentence corresponding to the received target input article, using the learned model. The learning device 100 transmits the generated summary sentence to the client device 201. The client device 201 receives the summary sentence corresponding to the target input article and outputs the summary sentence in such a manner that the system user refers to the summary sentence.

Thereby, the information processing system 200 reduces the work load applied on the system user when generating the summary sentence that summarizes the input article. Furthermore, the information processing system 200 generates a summary sentence that appropriately summarizes content, a point of an argument, or a main points of the input article, and makes the summary sentence referable by the system user. Therefore, the information processing system 200 prevents the system user from adopting an inappropriate summary sentence as the headline of the input article.

For example, the system user publishes the input article in a newspaper or on a website in association with the generated summary sentence. At this time, a viewer of the newspaper or the website views the appropriate summary sentence without viewing an inappropriate summary sentence, and easily and correctly grasps the content, point of an argument, or main point of the article, for example.

Use Example 2 of Information Processing System 200

The information processing system 200 is used for implementing a paper search support system, for example. Here, it is assumed that the system user wants to generate a summary sentence that summarizes a paper, for example. Specifically, it is assumed that the system user wants to generate a summary sentence that summarizes a paper and adopts the summary sentence as a title of the paper.

The learning device 100 stores training data including an input paper and a summary sentence that summarizes the input paper. The learning device 100 generates an inappropriate summary sentence by partially changing the summary sentence that summarizes the input paper. The learning device 100 learns a model that generates a summary sentence corresponding to an input paper in response to an input of the input paper on the basis of the training data and the generated inappropriate summary sentence.

The client device 201 transmits a target input paper of which a summary sentence is to be generated to the learning device 100. The learning device 100 generates a summary sentence corresponding to the received target input paper, using the learned model. The learning device 100 transmits the generated summary sentence to the client device 201. The client device 201 receives the summary sentence corresponding to the target input paper and outputs the summary sentence in such a manner that the system user refers to the summary sentence.

Thereby, the information processing system 200 reduces the work load on the system user when generating a summary sentence summarizing an input paper. Furthermore, the information processing system 200 generates a summary sentence that appropriately summarizes content, a point of an argument, or a main points of the input paper, and makes the summary sentence referable by the system user. Therefore, the information processing system 200 prevents the system user from adopting an inappropriate summary sentence as the title of the input paper.

For example, the system user associates the input paper with the generated summary sentence to implement a website at which papers are searchable. At this time, the viewer of the website views the appropriate summary sentence without viewing an inappropriate summary sentence, and easily and correctly grasps the content, point of an argument, or main point of the paper, for example.

Here, a case in which the information processing system 200 is used to implement the article editing support system or the paper search support system has been described, but the present embodiment is not limited to the case. For example, the information processing system 200 may be used for other purposes other than implementing the article editing support system or the paper search support system.

Hardware Configuration Example of Learning Device 100

Next, a hardware configuration example of the learning device 100 will be described with reference to FIG. 3.

Figure 3:
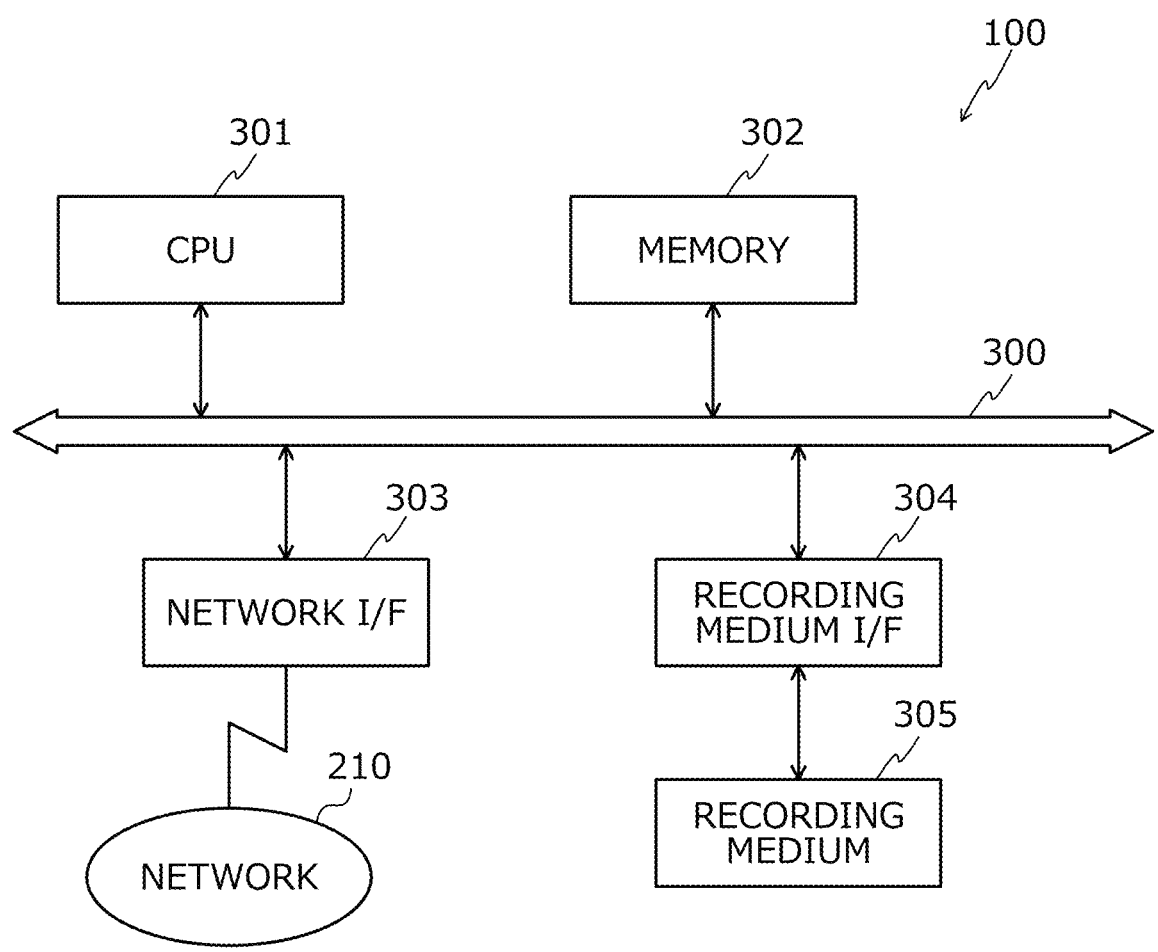
FIG. 3 is a block diagram illustrating a hardware configuration example of a learning device 100.

FIG. 3 is a block diagram illustrating a hardware configuration example of the learning device 100. In FIG. 3, the learning device 100 includes a central processing unit (CPU) 301, a memory 302, a network interface (I/F) 303, a recording medium I/F 304, and a recording medium 305. Furthermore, the individual components are connected to one another by a bus 300, respectively.

Here, the CPU 301 performs overall control of the learning device 100. For example, the memory 302 includes a read only memory (ROM), a random access memory (RAM), a flash ROM, and the like. Specifically, for example, the flash ROM or the ROM stores various programs, and the RAM is used as a work area for the CPU 301. The programs stored in the memory 302 are loaded into the CPU 301 to cause the CPU 301 to execute coded processing.

The network I/F 303 is connected to the network 210 through a communication line, and is connected to another computer through the network 210. Then, the network I/F 303 is in charge of an interface between the network 210 and the inside, and controls input and output of data to and from another computer. The network I/F 303 is, for example, a modem, a LAN adapter, and the like.

The recording medium I/F 304 controls reading and writing of data to and from the recording medium 305 under the control of the CPU 301. Examples of the recording medium I/F 304 include a disk drive, a solid state drive (SSD), a universal serial bus (USB) port, and the like. The recording medium 305 is a nonvolatile memory that stores data written under the control of the recording medium I/F 304. Examples of the recording medium 305 include a disk, a semiconductor memory, a USB memory, and the like. The recording medium 305 may be attachable to and detachable from the learning device 100.

The learning device 100 may include, for example, a keyboard, a mouse, a display, a printer, a scanner, a microphone, a speaker, and the like in addition to the above-described configuration units. Furthermore, the learning device 100 may include a plurality of the recording medium I/Fs 304 and the recording media 305. Furthermore, the learning device 100 does not have to include the recording medium I/F 304 and the recording medium 305.

Content Stored in Training Data Management Table 400

Next, an example of content stored in the training data management table 400 will be described with reference to FIG. 4. The training data management table 400 is implemented by a storage area of the memory 302, the recording medium 305, or the like of the learning device 100 illustrated in FIG. 3, for example.

Figure 4:
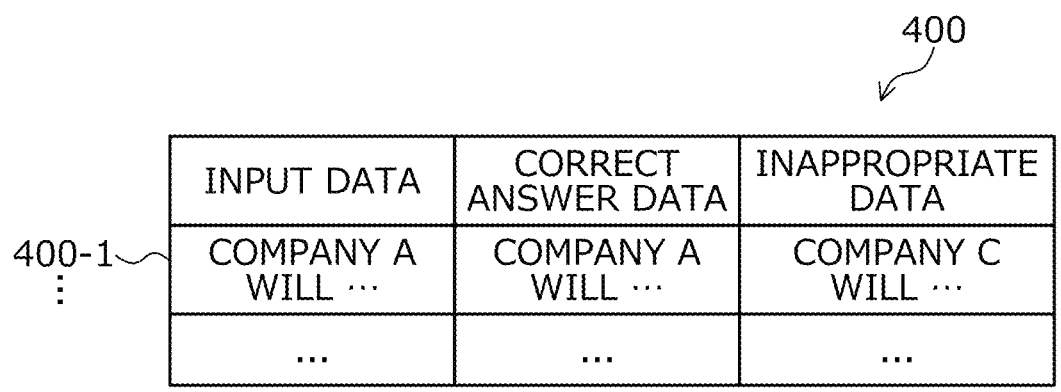
FIG. 4 is an explanatory diagram illustrating an example of content stored in a training data management table 400.

FIG. 4 is an explanatory diagram illustrating an example of content stored in a training data management table 400. As illustrated in FIG. 4, the training data management table 400 has fields for input data, correct answer data, and inappropriate data. In the training data management table 400, training data management information is stored as a record 400-$a$ by setting information in each field for each training data. The letter a represents any integer.

In the input data field, input data with which an input sentence is specified is set. The input sentence is, for example, an input article. The input data is, for example, an input sentence. The input data may indicate, for example, a storage location of the input sentence. In the correct answer data field, correct answer data, with which a summary sentence that summarizes the input sentence and is treated as a correct answer is specified, is set. The correct answer data is, for example, a summary sentence. The correct answer data may indicate, for example, a storage location of the summary sentence. The combination of the input data and the correct answer data is the training data. In the inappropriate data field, inappropriate data, with which an inappropriate summary sentence that is a partially-modified version of the summary sentence is specified, is set. The inappropriate data is, for example, an inappropriate summary sentence. The inappropriate data may indicate, for example, a storage location of the inappropriate summary sentence.

Content Stored in Word Data Management Table 500

Next, an example of content stored in the word data management table 500 will be described with reference to FIG. 5. The word data management table 500 is implemented by a storage area of the memory 302, the recording medium 305, or the like of the learning device 100 illustrated in FIG. 3, for example.

FIG. 5 is an explanatory diagram illustrating an example of content stored in a word data management table 500. As illustrated in FIG. 5, the word data management table 500 has fields for attribute and word data. In the word data management table 500, word data management information is stored as a record 500-$b$ by setting information in each field for each word data. The letter b represents any integer.

In the attribute field, an attribute of a word that is a named entity is set. The attribute is, for example, an organization name, a person name, a numerical expression, or the like. In the word data field, word data with which the above-described word is specified is set. The word data is, for example, the above-described word. The word data may be, for example, a unit that makes the above-described numerical expression specifiable.

Hardware Configuration Example of Client Device 201

Since the hardware configuration example of the client device 201 is similar to the hardware configuration example of the learning device 100 illustrated in FIG. 3, for example, description thereof is omitted.

Functional Configuration Example of Learning Device 100

Next, a functional configuration example of the learning device 100 will be described with reference to FIG. 6.

Figure 6:
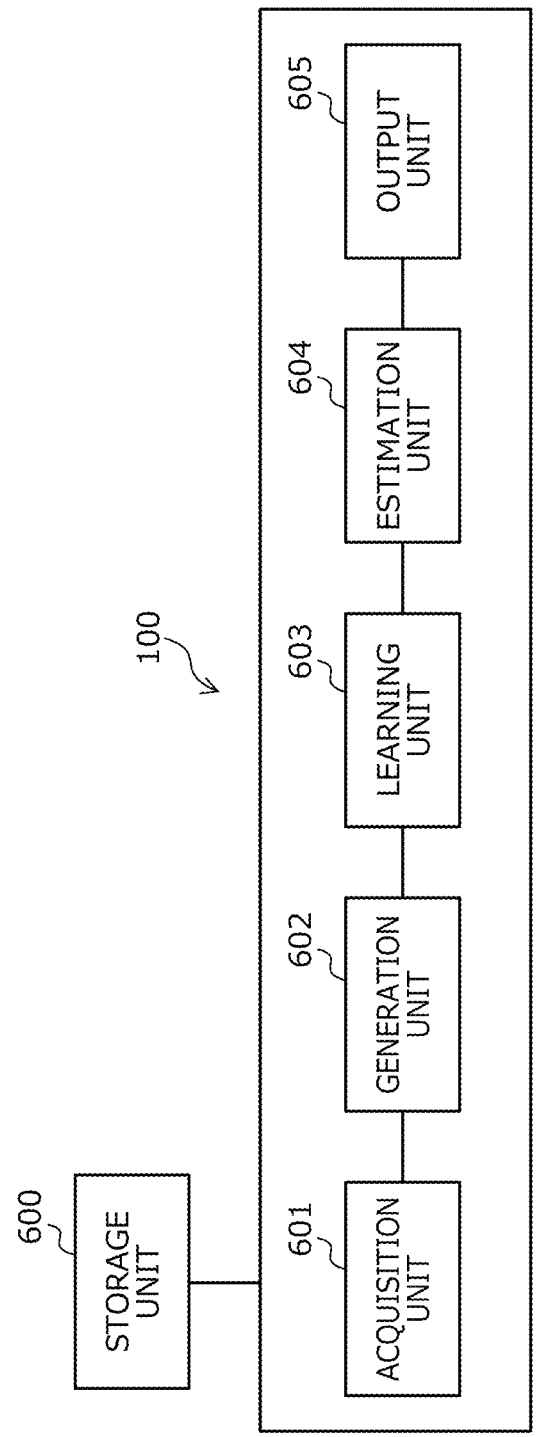
FIG. 6 is a block diagram illustrating a functional configuration example of the learning device 100.

FIG. 6 is a block diagram illustrating a functional configuration example of the learning device 100. The learning device 100 includes a storage unit 600, an acquisition unit 601, a generation unit 602, a learning unit 603, an estimation unit 604, and an output unit 605.

The storage unit 600 is implemented by a storage area of the memory 302, the recording medium 305, or the like illustrated in FIG. 3, for example. Hereinafter, a case in which the storage unit 600 is included in the learning device 100 will be described, but the embodiment is not limited to the case. For example, the storage unit 600 may be included in a device different from the learning device 100, and content stored in the storage unit 600 may be able to be referred to by the learning device 100.

The acquisition unit 601 to the output unit 605 function as an example of a control unit. Specifically, for example, the acquisition unit 601 to the output unit 605 implement functions thereof by causing the CPU 301 to execute a program stored in the storage area of the memory 302, the recording medium 305, or the like or by the network I/F 303 illustrated in FIG. 3. A processing result of each functional unit is stored in the storage area of the memory 302, the recording medium 305, or the like illustrated in FIG. 3, for example.

The storage unit 600 stores various types of information to be referred to or updated in the processing of each functional unit. The storage unit 600 stores an input sentence and a summary sentence that summarizes the input sentence. The storage unit 600 stores, for example, the input sentence and the summary sentence that summarizes the input sentence, using the training data management table 400. The input sentence is, for example, an input article. The input sentence and the summary sentence that summarizes the input sentence are acquired by, for example, the acquisition unit 601. The input sentence and the summary sentence that summarizes the input sentence may be stored in advance by the storage unit 600, for example.

The storage unit 600 stores another summary sentence different from the summary sentence that summarizes the input sentence. The another summary sentence is generated on the basis of the summary sentence that summarizes the input sentence. The storage unit 600 stores the another summary sentence that is obtained by partially changing the summary sentence that summarizes the input sentence or by searching for another summary sentence that partially matches the summary sentence. The another summary sentence is, for example, an inappropriate summary sentence for the input sentence. The storage unit 600 stores the another summary sentence obtained by partially changing the summary sentence that summarizes the input sentence, using the training data management table 400. The storage unit 600 stores the another summary sentence obtained by partially masking the summary sentence that summarizes the input sentence and searching for another summary sentence similar to the masked summary sentence, using the training data management table 400. The another summary sentence is generated by, for example, the generation unit 602. The another summary sentence may be stored in advance by the storage unit 600, for example.

The storage unit 600 stores a list in which a plurality of words of named entities are registered. The list is used when, for example, partially changing the summary sentence that summarizes the input sentence. The word is, for example, an organization name or a person name. The list is implemented by, for example, the word data management table 500. The storage unit 600 may store information that makes a numerical expression specifiable. The storage unit 600 stores, for example, a unit assigned to a predetermined type of numerical value with respect to the numerical expression.

The storage unit 600 stores a model that generates a summary sentence corresponding to an input sentence in response to an input of the input sentence. The model calculates a probability that each of a plurality of words appears in the summary sentence corresponding to the input sentence, and generates the summary sentence on the basis of the calculated probability. Specifically, the model is a neural network. The model is generated by the learning unit 603, for example.

The acquisition unit 601 acquires various types of information to be used for the processing of each functional unit. The acquisition unit 601 stores the acquired various types of information in the storage unit 600 or outputs the acquired various types of information to each functional unit. Furthermore, the acquisition unit 601 may output the various types of information stored in the storage unit 600 to each functional unit. The acquisition unit 601 acquires the various types of information on the basis of, for example, an operation input by the system administrator. The acquisition unit 601 may receive the various types of information from a device different from the learning device 100, for example.

The acquisition unit 601 acquires the input sentence and the summary sentence that summarizes the input sentence. The acquisition unit 601 acquires, for example, a first input sentence and a first summary sentence that summarizes the first input sentence. The first summary sentence is considered appropriate as a correct answer, for example. Specifically, the acquisition unit 601 acquires the first input sentence and the first summary sentence that summarizes the first input sentence on the basis of the operation input of the system administrator. Specifically, the acquisition unit 601 may acquire, by reading, the first input sentence and the first summary sentence that summarizes the first input sentence from the detachable recording medium 305. Specifically, the acquisition unit 601 may acquire, by receiving, the first input sentence and the first summary sentence that summarizes the first input sentence from another computer. The another computer is, for example, the client device 201.

The acquisition unit 601 acquires a request for generating a summary sentence corresponding to a target input sentence. The request includes, for example, the target input sentence. The acquisition unit 601 acquires, by receiving, the request for generating a summary sentence corresponding to the target input sentence from another computer, for example. The another computer is, for example, the client device 201. The acquisition unit 601 may acquire the request for generating a summary sentence corresponding to the target input sentence on the basis of the operation input of the system administrator, for example.

The acquisition unit 601 may accept a start trigger to start processing of one of the functional units. The start trigger is, for example, a fact that a predetermined operation input has been made by the system administrator. The start trigger may be, for example, receipt of predetermined information from another computer. The start trigger may be, for example, output of predetermined information by any one of the functional units.

For example, the acquisition unit 601 may accept acquisition of an input sentence and a summary sentence that summarizes the input sentence have been acquired as the start trigger to start the processing with the generation unit 602 and the learning unit 603. For example, the acquisition unit 601 may accept the fact that a predetermined operation input has been made by the system administrator as the start trigger to start the processing with the generation unit 602 and the learning unit 603. For example, the acquisition unit 601 may accept acquisition of the request for generating a summary sentence corresponding to the target input sentence as the start trigger to start the processing of the estimation unit 604.

The generation unit 602 generates a second summary sentence similar to the acquired first summary sentence. The second summary sentence is, for example, a summary sentence that is considered inappropriate as a correct answer. The generation unit 602 generates the second summary sentence that partially matches the acquired first summary sentence. For example, the generation unit 602 randomly selects a word included in the first summary sentence and changes the selected word to another word other than the selected word to generate the second summary sentence. Alternatively, the generation unit 602 generates the second summary sentence by searching another training data for a summary sentence partially matching the first summary sentence, using a sentence in which the acquired first summary sentence is partially hidden as a search condition. Thereby, the generation unit 602 makes the inappropriate summary sentence, which is a negative example, available for training the model.

The generation unit 602 generates the second summary sentence by searching for a summary sentence having a word partially matching the first summary sentence, using a sentence obtained by hiding a person name, a proper noun, or the like acquired by a named entity extractor from the summary sentence as a correct answer as the search condition, for example. Thereby, the generation unit 602 makes the inappropriate summary sentence, which is a negative example, available for training the model. Furthermore, the generation unit 602 generates the second summary sentence likely to be considered inappropriate for the first input sentence from the viewpoint of the viewer as the summary sentence of a negative example, by changing a specific word included in the first summary sentence. Therefore, with the trained model, the generation unit 602 reduces the probability of generating an inappropriate summary sentence.

The generation unit 602 generates the second summary sentence by hiding a numerical value or the like acquired by the named entity extractor from the summary sentence as a correct answer, for example, and searching another training data for a partially similar summary sentence. Thereby, the generation unit 602 makes the inappropriate summary sentence, which is a negative example, available for training the model. Furthermore, the generation unit 602 generates the second summary sentence likely to be considered inappropriate for the first input sentence from the viewpoint of the viewer as a negative example, by changing the numerical value. Therefore, with the trained model, the generation unit 602 reduces the probability of generating an inappropriate summary sentence.

The learning unit 603 learns the model on the basis of the acquired first input sentence, the acquired first summary sentence, and the generated second summary sentence. The learning unit 603 leans the model such that the first probability of generating the first summary sentence in response to the input of the first input sentence becomes higher than the second probability of generating the second summary sentence in response to the input of the first input sentence, for example.

Specifically, using the model, the learning unit 603 calculates the probability that each of a plurality of words appears in the summary sentence corresponding to the first input sentence, and calculates the first probability and the second probability on the basis of the calculated probability. Then, specifically, the learning unit 603 learns the model by updating the model on the basis of the first input sentence, the first summary sentence, and the second summary sentence when the calculated first probability is higher than the calculated second probability.

More specifically, the learning unit 603 determines a direction of changing each parameter of the model on the basis of the first input sentence, the first summary sentence, and the second summary sentence, using the loss function, when the calculated first probability is higher than the calculated second probability. Then, more specifically, the learning unit 603 learns the model by updating the parameters of the model according to the determined direction. Thereby, the learning unit 603 learns the model capable of accurately generating the summary sentence corresponding to the input sentence.

The estimation unit 604 generates a summary sentence corresponding to the target input sentence, using the learned model. The estimation unit 604 generates a summary sentence corresponding to the target input sentence by inputting the target input sentence to the learned model. Thereby, the estimation unit 604 accurately generates the summary sentence corresponding to the input sentence.

The output unit 605 outputs a processing result of at least one of the functional units. An output format is, for example, display on a display, print output to a printer, transmission to an external device by the network I/F 303, or storage in the storage area such as the memory 302 or the recording medium 305. Thereby, the output unit 605 enables notification of the processing result of at least one of the functional units to the system administrator and improves the convenience of the learning device 100.

The output unit 605 outputs, for example, the learned model. Specifically, the output unit 605 transmits the learned model to another computer. Thereby, the output unit 605 makes the model capable of accurately generating the summary sentence corresponding to the input sentence available in another computer. Therefore, the output unit 605 enables another computer to accurately generate the summary sentence corresponding to the input sentence.

The output unit 605 outputs, for example, the generated summary sentence corresponding to the target input sentence. Specifically, the output unit 605 transmits the summary sentence corresponding to the target input sentence to another computer that is a transmission source of the request. The another computer is, for example, the client device 201. Specifically, the output unit 605 may display the summary sentence corresponding to the target input sentence. Thereby, the output unit 605 makes the appropriate summary sentence corresponding to the target input sentence referable by the system user.

Here, a case in which the generation unit 602 generates the second summary sentence has been described, but the present embodiment is not limited to the case. For example, another computer may generate the second summary sentence. In this case, the acquisition unit 601 acquires the second summary sentence from the another computer. Furthermore, in this case, the learning device 100 does not have to include the generation unit 602.

Flow of Operation of Learning Device 100

Figure 7:
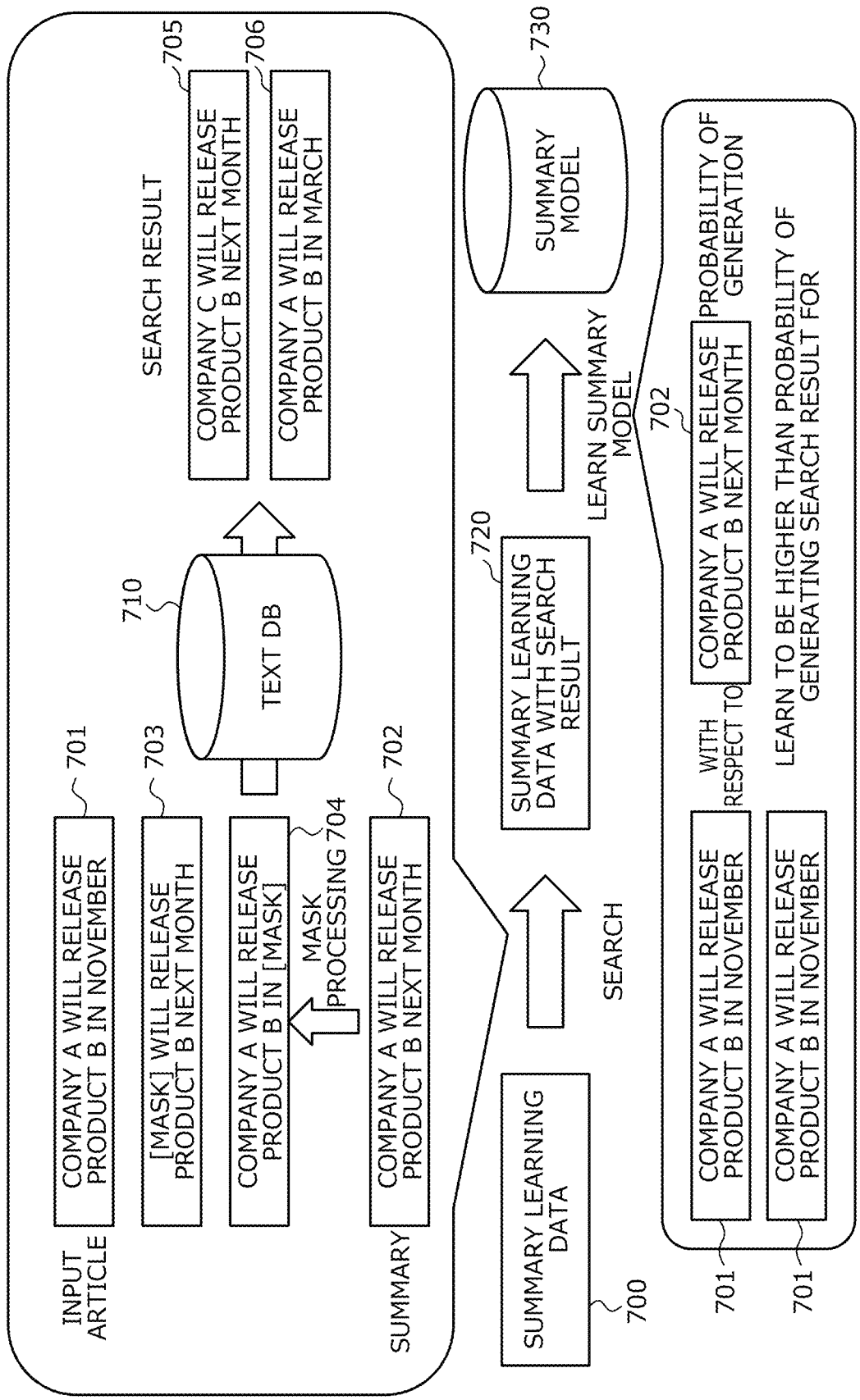
FIG. 7 is an explanatory diagram illustrating a flow of operation of the learning device 100.

Next, a flow of operation of the learning device 100 will be described with reference to FIG. 7. FIG. 7 is an explanatory diagram illustrating a flow of operation of the learning device 100.

(7-1) The learning device 100 acquires summary learning data 700. The summary learning data 700 includes an input article 701 and a summary sentence 702 that summarizes the input article 701.

(7-2) The learning device 100 generates template sentences 703 and 704 in which a part of the summary sentence 702 is masked. The learning device 100 refers to a text database (DB) 710 and searches for texts to be inserted in the masked parts of the template sentences 703 and 704. The learning device 100 inserts the searched texts into the masked parts of the template sentences 703 and 704 to generate search results 705 and 706. The search results 705 and 706 correspond to inappropriate summary sentences for the input article 701.

The learning device 100 provides the search results 705 and 706 to the summary learning data 700 to generate summary learning data 720 with the search results. Thereby, the learning device 100 obtains the inappropriate summary sentences, which are negative examples. Therefore, the learning device 100 learns a summary model 730 capable of generating a summary sentence corresponding to an input sentence in consideration of viewpoints based on the search results 705 and 706 other than the viewpoint based on the summary sentence 702.

(7-3) With the summary model 730, the learning device 100 learns the summary model 730 such that a generation probability of generating the summary sentence 702 according to the input article 701 becomes higher than a generation probability of generating the search results 705 and 706 according to the input article 701. A specific example of the summary model 730 will be described below with reference to, for example, FIG. 8.

The learning device 100 calculates, for example, the generation probability of generating the summary sentence 702 according to the input article 701, using the summary model 730. A specific example of calculating the generation probability of generating the summary sentence 702 will be described below with reference to, for example, FIG. 9. Furthermore, the learning device 100 calculates, for example, the generation probabilities of generating the search results 705 and 706 according to the input article 701, using the summary model 730. A specific example of calculating the generation probabilities of generating the search results 705 and 706 will be described below with reference to, for example, FIG. 10.

The learning device 100 determines, for example, whether the generation probability of generating the summary sentence 702 is higher than the generation probability of generating the search result 705. Here, the learning device 100 does not update the parameters of the summary model 730 in the case where, for example, the generation probability of generating the summary sentence 702 is equal to or lower than the generation probability of generating the search result 705. On the other hand, the learning device 100 updates the parameters of the summary model 730 in the case where, for example, the generation probability of generating the summary sentence 702 is higher than the generation probability of generating the search result 705.

Specifically, the learning device 100 updates the parameters of the summary model 730 on the basis of the input article 701, the summary sentence 702, and the search result 705, using the loss function. The loss function shows a relatively smaller value as the summary sentence generated by the summary model 730 according to the input article 701 is more similar to the summary sentence 702 as a correct answer, for example. The loss function shows a relatively smaller value as the summary sentence generated by the summary model 730 according to the input article 701 further widens a gap from the search result 705 as an incorrect answer, for example. More specifically, the learning device 100 specifies the direction of changing the parameters of the summary model 730 so as to minimize the loss function. Then, more specifically, the learning device 100 updates the parameters of the summary model 730 according to the specified direction.

The learning device 100 determines, for example, whether the generation probability of generating the summary sentence 702 is higher than the generation probability of generating the search result 706. Here, the learning device 100 does not update the parameters of the summary model 730 in the case where, for example, the generation probability of generating the summary sentence 702 is equal to or lower than the generation probability of generating the search result 706. On the other hand, the learning device 100 updates the parameters of the summary model 730 on the basis of the input article 701, the summary sentence 702, and the search result 706 in the case where, for example, the generation probability of generating the summary sentence 702 is higher than the generation probability of generating the search result 706.

Specifically, the learning device 100 updates the parameters of the summary model 730 on the basis of the input article 701, the summary sentence 702, and the search result 706, using the loss function. The loss function shows a relatively smaller value as the summary sentence generated by the summary model 730 according to the input article 701 is more similar to the summary sentence 702 as a correct answer, for example. The loss function shows a relatively smaller value as the summary sentence generated by the summary model 730 according to the input article 701 further widens a gap from the search result 706 as an incorrect answer, for example. More specifically, the learning device 100 specifies the direction of changing the parameters of the summary model 730 so as to minimize the loss function. Then, more specifically, the learning device 100 updates the parameters of the summary model 730 according to the specified direction.

Thereby, the learning device 100 learns the summary model 730 capable of accurately generating the summary sentence corresponding to the input sentence. The learning device 100 learns the summary model 730 in consideration of the search results 705 and 706 as incorrect answers in addition to the summary sentence 702 as a correct answer, for example. Therefore, the learning device 100 learns the summary model 730 such that the probability of generating an inappropriate summary sentence becomes low. Furthermore, the learning device 100 accurately generates the summary sentence corresponding to the target input sentence, using the learned summary model 730.

Here, a case in which the learning device 100 generates the template sentences 703 and 704 in which a part of the summary sentence 702 is masked, and generates the inappropriate summary sentences by inserting some texts into the masked parts of the template sentences 703 and 704 has been described. However, the embodiment is not limited to the case. For example, the learning device 100 may have a summary sentence DB that stores various summary sentences, and generate inappropriate summary sentences by searching the summary sentence DB for other summary sentences similar to the summary sentence 702.

Specifically, the learning device 100 may calculate a similarity between the summary sentence 702 and each of the summary sentences in the summary sentence DB, and generate an inappropriate summary sentence by searching for another summary sentence similar to the summary sentence 702 on the basis of the calculated similarity.

Furthermore, specifically, the learning device 100 generates inappropriate summary sentences by searching the summary sentence DB for other summary sentences that match the template sentences 703 and 704 in which a part of the summary sentence 702 is masked. More specifically, it is conceivable that the learning device 100 generates an inappropriate summary sentence by searching the summary sentence DB for another summary sentence that matches the template sentence 703="[MASK] will release a product B next month" except for the [MASK] part.

Furthermore, more specifically, the learning device 100 may calculate the similarity between each summary sentence in the summary sentence DB and a part other than the [MASK] part of the template sentence 703="[MASK] will release a product B next month". Then, it is conceivable that the learning device 100 generates an inappropriate summary sentence by searching the summary sentence DB for a summary sentence having a relatively high similarity to the template sentence 703 on the basis of the calculated similarity. Here, the learning device 100 may generate a summary sentence such as "Company C will expand the organization next month" having a similar sentence configuration as an inappropriate summary sentence although the words such as "product B" and "release" are not included. As a result, the learning device 100 increases the variation of inappropriate summary sentences.

Specific Example of Learning Summary Model 730

Next, a specific example of learning the summary model 730 will be described with reference to FIGS. 8 to 10. First, an example of the summary model 730 will be described with reference to FIG. 8.

Figure 8:
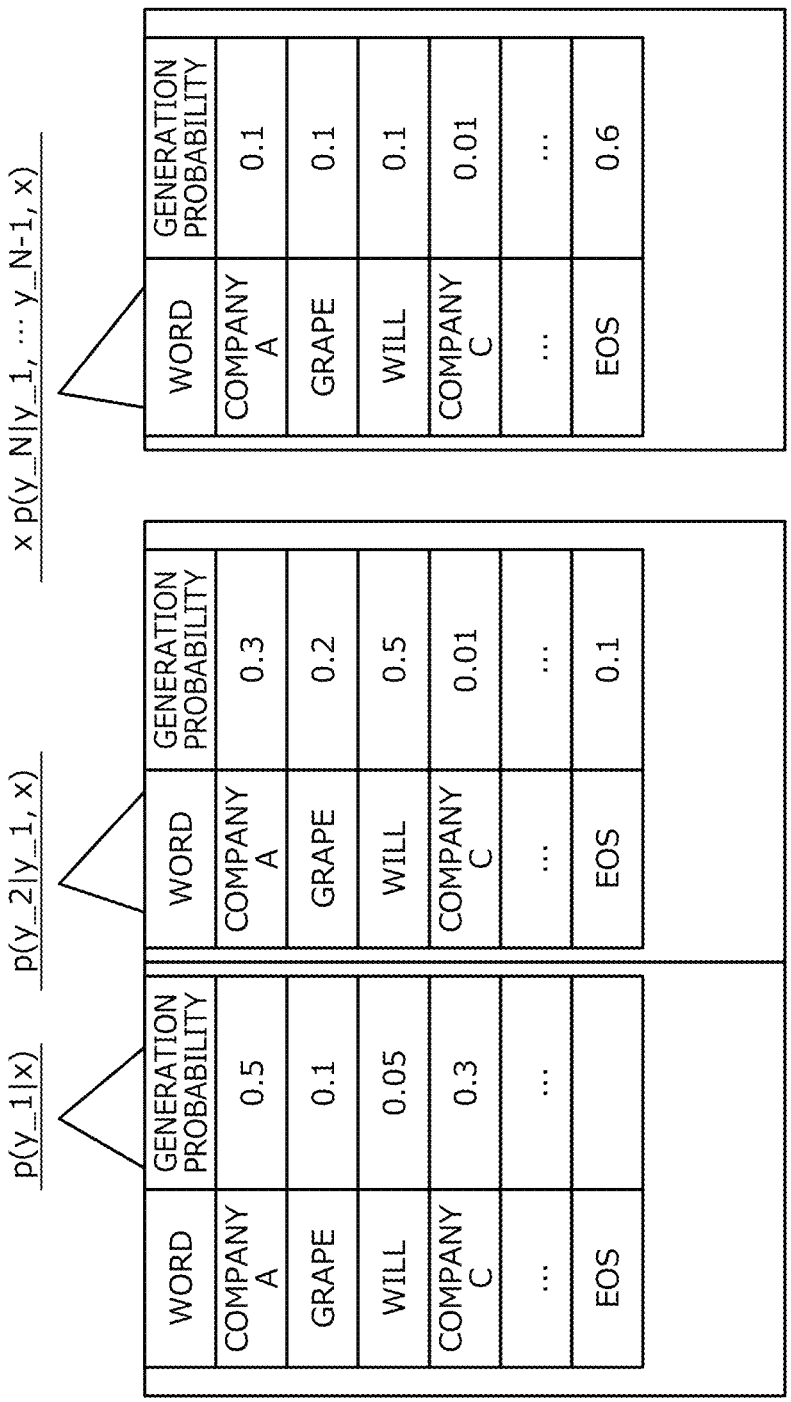
FIG. 8 is an explanatory diagram illustrating an example of a summary model 730.

FIG. 8 is an explanatory diagram illustrating an example of the summary model 730. The summary model 730 is a neural network for implementing a function $p(y\_N|y\_1, \ldots, y\_N-1, x)$ for calculating the generation probability indicating a probability that each of a plurality of words appears as the i-th word in the summary sentence, and outputting a word $y\_i$ with the highest generation probability. x is an input sentence. x is, for example, the input article 701. N is an integer of 0 or larger. The plurality of words includes, for example, a special word EOS (end of string) indicating completion of the generation of the summary sentence.

Next, an example of updating parameters of the summary model 730 will be described with reference to FIGS. 9 and 10.

Figure 9:
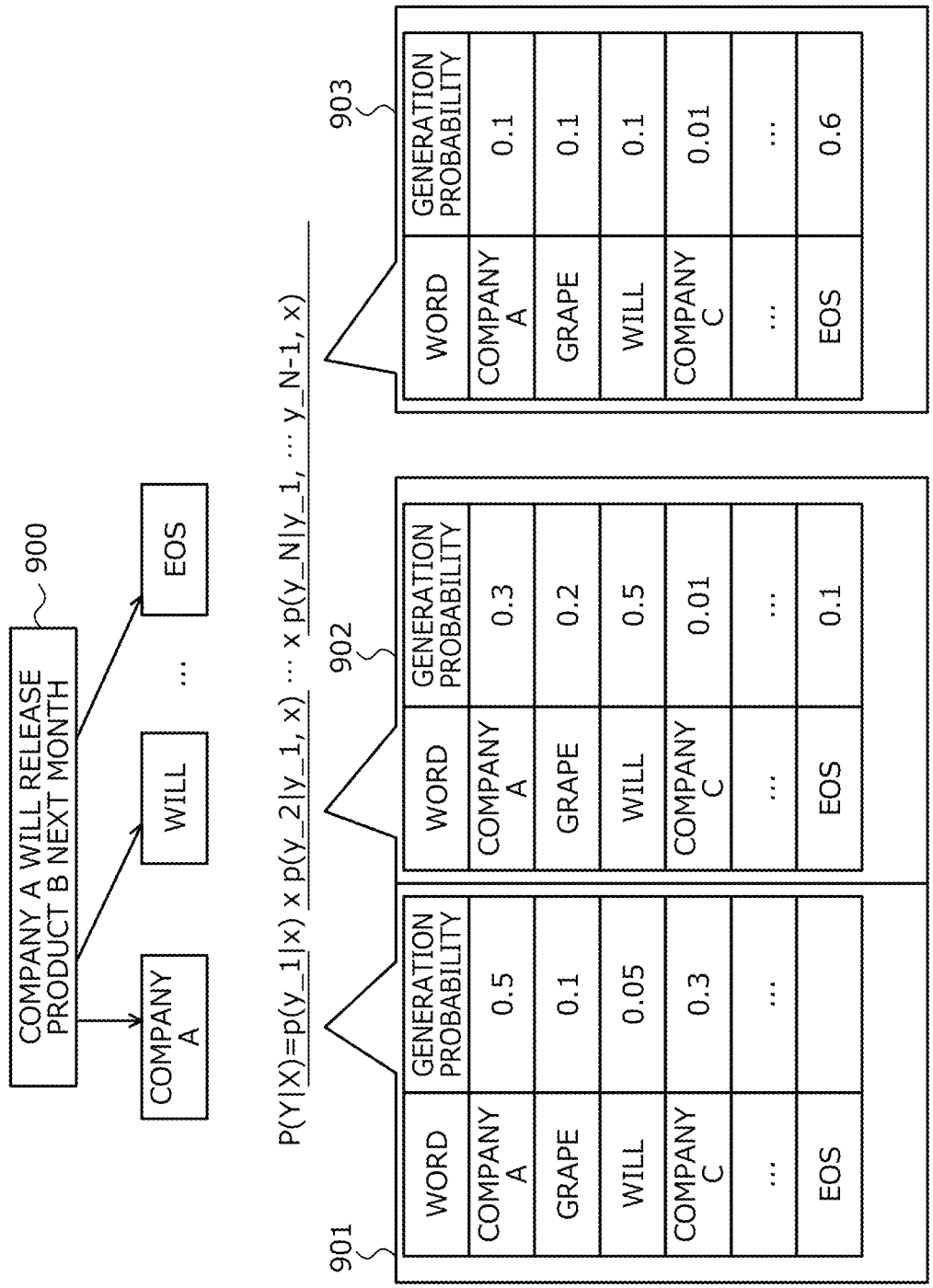
FIG. 9 is an explanatory diagram (part 1) illustrating an example of updating parameters of the summary model 730.
Figure 10:
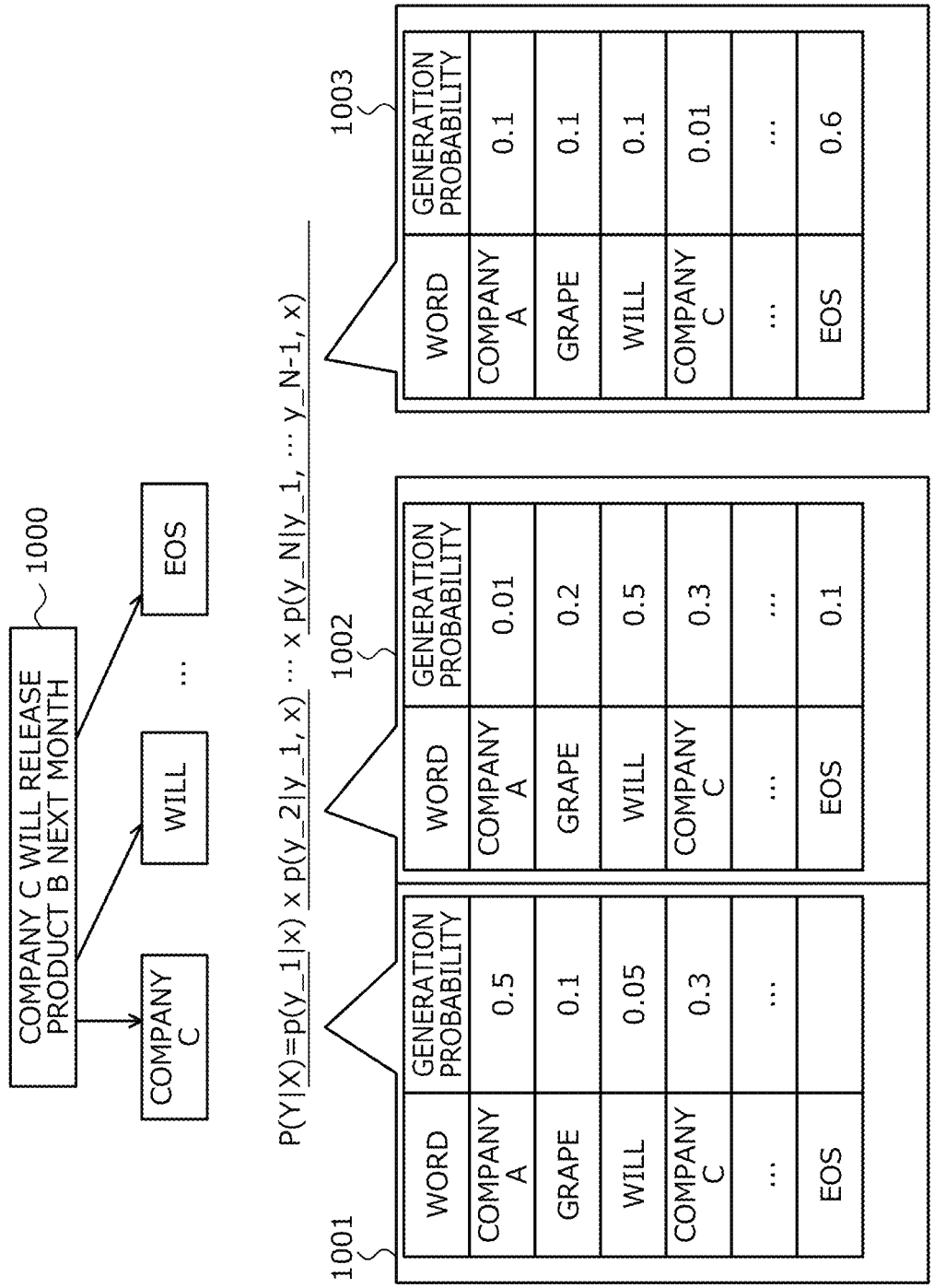
FIG. 10 is an explanatory diagram (part 2) illustrating an example of updating parameters of the summary model 730.

FIGS. 9 and 10 are explanatory diagrams illustrating an example of updating the parameters of the summary model 730. In FIG. 9, it is assumed that the learning device 100 has already acquired a summary sentence 900 that summarizes the input article 701. Here, it is assumed that the word "EOS" exists after the word "release" in the summary sentence 900.

The learning device 100 sets the input article 701 as x, acquires a table 901 of the generation probability of each word, and acquires the generation probability "p(y_1|x) =0.5" of the first word "Company A" in the summary sentence 900, using the summary model 730.

Next, the learning device 100 sets y_1=Company A, acquires a table 902 of the generation probability of each word, and acquires the generation probability "p(y_2|y_1, x)=0.5" of the second word "will" in the summary sentence 900, using the summary model 730. After that, the learning device 100 similarly acquires the generation probability "p(y_i|y_1, . . . , y_i−1, x)" of the i-th word in the summary sentence 900.

Finally, the learning device 100 acquires a table 903 of the generation probability of each word and acquires the generation probability "p(y_N|y_1, . . . , y_N−1, x)=0.6" of the last word "EOS" in the summary sentence 900. The learning device 100 multiplies the generation probabilities of each word of the summary sentence 900 to calculate the generation probability P(Y|X) of the summary sentence 900. Next, the description will be moved onto FIG. 10.

In FIG. 10, it is assumed that the learning device 100 has already generated a search result 1000 in which the summary sentence 900 summarizing the input article 701 is partially changed. Here, it is assumed that the word "EOS" exists after the word "release" in a search result 1000.

The learning device 100 sets the input article 701 as x, acquires a table 1001 of the generation probability of each word, and acquires the generation probability "p(y_1|x) =0.3" of the first word "Company C" of the search result 1000, using the summary model 730.

Next, the learning device 100 sets y_1=Company C, acquires a table 1002 of the generation probability of each word, and acquires the generation probability "p(y_2|y_1, x)=0.5" of the second word "will" of the search result 1000, using the summary model 730. After that, the learning device 100 similarly acquires the generation probability "p(y_i|y_1, . . . , y_i−1, x)" of the i-th word in the search result 1000.

Finally, the learning device 100 acquires a table 1003 of the generation probability of each word and acquires the generation probability "p(y_N|y_1, . . . , y_N−1, x)=0.6" of the last word "EOS" of the search result 1000. The learning device 100 multiplies the generation probabilities of each word of the search result 1000 to calculate the generation probability P(Y|X) of the search result 1000.

The learning device 100 determines whether the generation probability P(Y|X) of the summary sentence 900 is higher than the generation probability P(Y|X) of the search result 1000. Here, the learning device 100 does not update the parameters of the summary model 730 in the case where the generation probability P(Y|X) of the summary sentence 900 is equal to or lower than the generation probability P(Y|X) of the search result 1000. On the other hand, the learning device 100 updates the parameters of the summary model 730 in the case where the generation probability P(Y|X) of the summary sentence 900 is higher than the generation probability P(Y|X) of the search result 1000. Specifically, the learning device 100 updates the parameters of the summary model 730 on the basis of the input article 701, the summary sentence 900, and the search result 1000, using the loss function.

Specific Example Using Summary Model 730

Next, a specific example of generating a summary sentence corresponding to a target input article, using the summary model 730, will be described with reference to FIG. 11.

Figure 11:
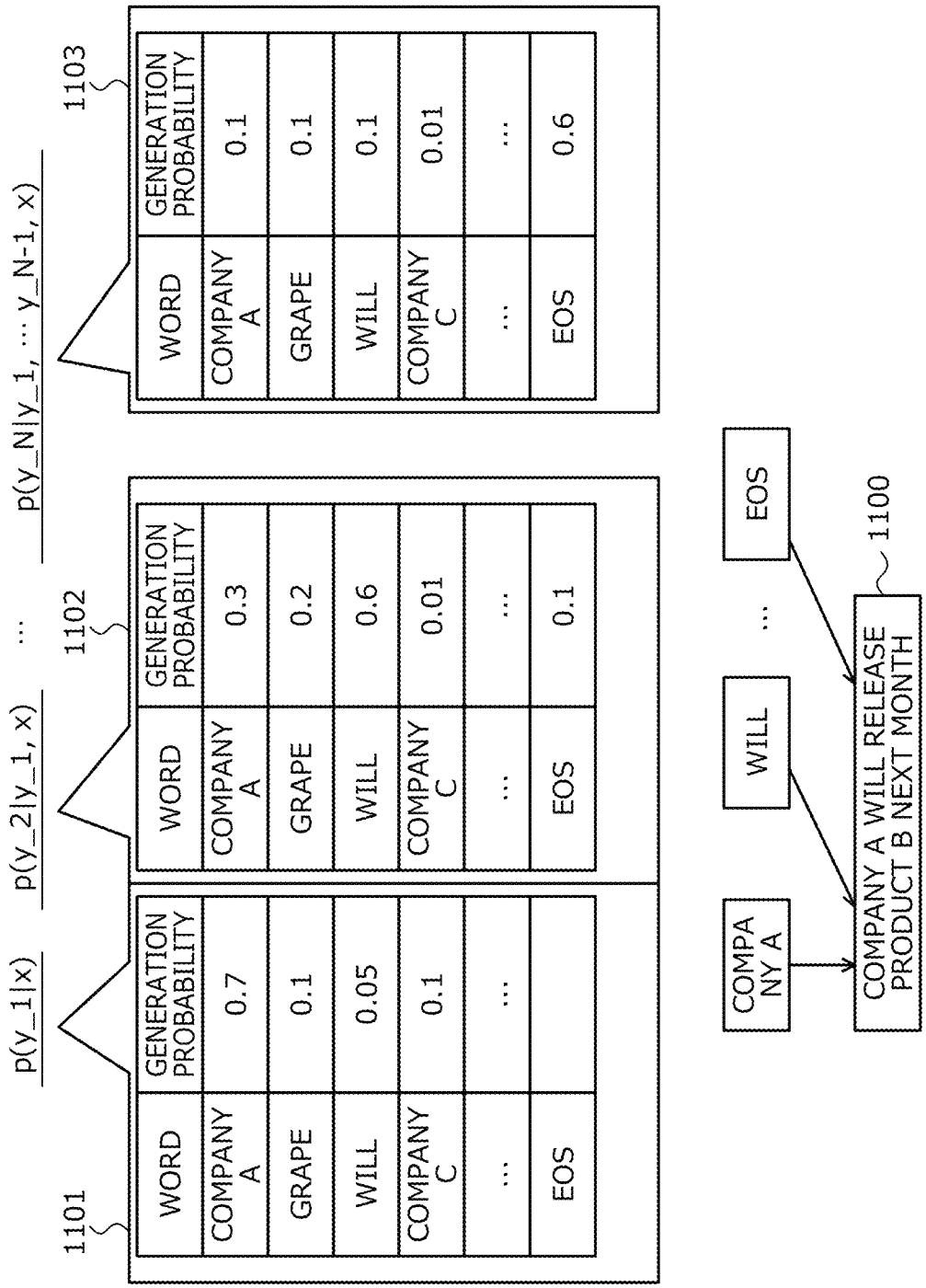
FIG. 11 is an explanatory diagram illustrating a specific example of using the summary model 730.

FIG. 11 is an explanatory diagram illustrating a specific example of using the summary model 730. In FIG. 11, the learning device 100 sets the target input article as x, acquires a table 1101 of the generation probability of each word, and sets the word "Company A" having the highest generation probability as the first word of a summary sentence 1100, using the summary model 730.

Next, the learning device 100 sets the target input article as x and sets the first word of the summary sentence 1100 y_1="Company A", acquires a table 1102 of the generation probability of each word, and sets the word "will" having the highest generation probability as the second word of the summary sentence 1100, using the summary model 730. Hereinafter, the learning device 100 similarly sets the i-th word of the summary sentence 1100.

Finally, the learning device 100 acquires a table 1103 of the generation probability of each word, and completes the generation of the summary sentence 1100 because the generation probability of the word "EOS" is the highest. In the example of FIG. 11, the summary sentence 1100 is illustrated as a state after generation is completed. Thereby, the learning device 100 accurately generates the summary sentence.

Learning Process Procedure

Next, an example of a learning processing procedure executed by the learning device 100 will be described with reference to FIG. 12. The learning processing is implemented by, for example, the CPU 301, the storage area of the memory 302, the recording medium 305, or the like, and the network I/F 303 illustrated in FIG. 3.

Figure 12:
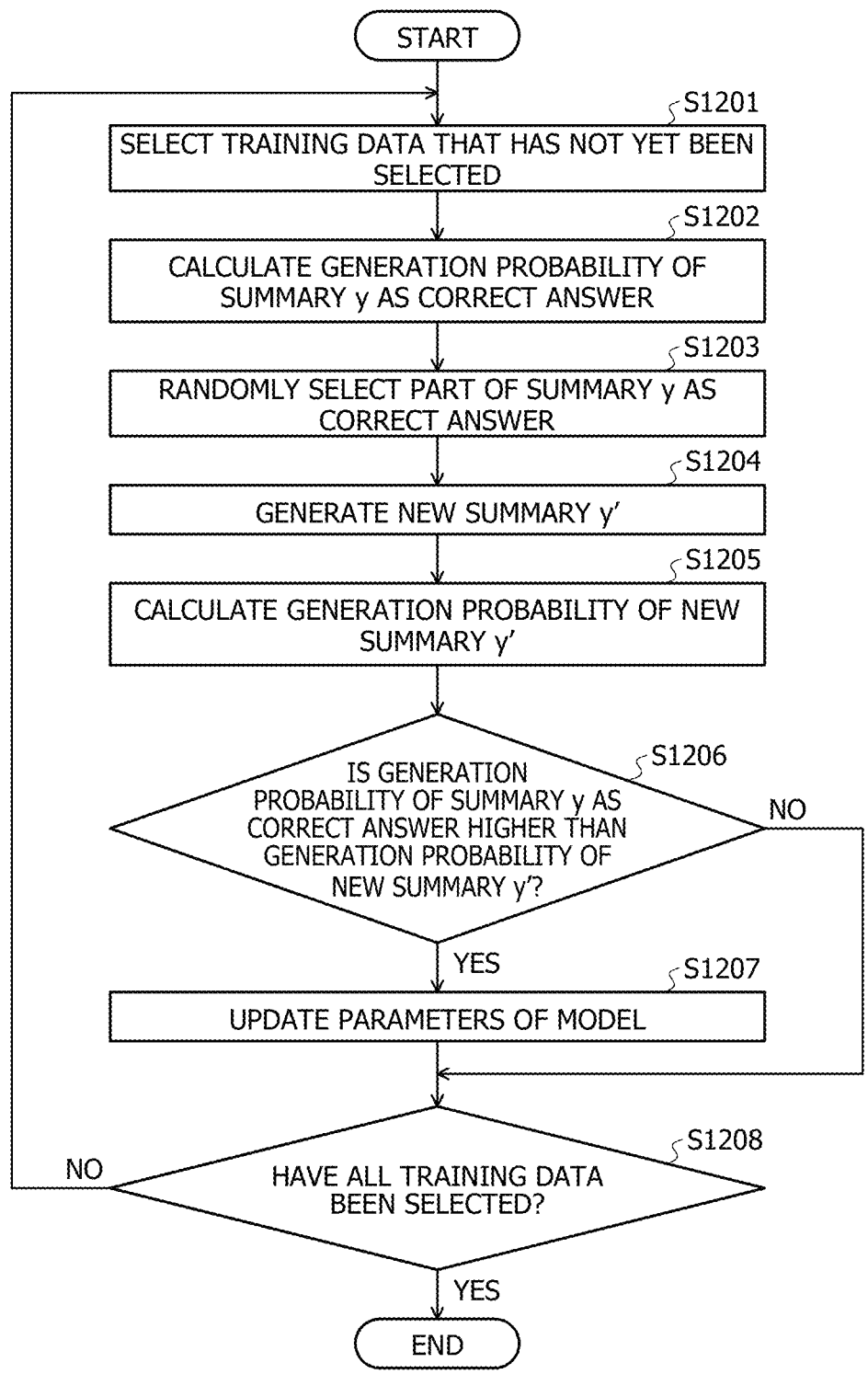
FIG. 12 is a flowchart illustrating an example of a learning processing procedure.

FIG. 12 is a flowchart illustrating an example of a learning processing procedure. In FIG. 12, the learning device 100 selects training data that has not yet been selected from a training data group (operation S1201).

Next, the learning device 100 calculates the generation probability of a summary y as a correct answer included in the selected training data on the basis of the input article x included in the selected training data (operation S1202). Then, the learning device 100 randomly selects a part of the summary y as a correct answer (operation S1203).

Next, the learning device 100 generates a new summary y' by replacing a part of the selected summary y as a correct answer (operation S1204). Then, the learning device 100 calculates the generation probability of the generated new summary y' on the basis of the input article x (operation S1205).

Next, the learning device 100 determines whether the generation probability of the summary y as a correct answer is higher than the generation probability of the new summary y' (operation S1206). Here, in the case where the generation probability of the summary y as a correct answer is equal to or lower than the generation probability of the new summary y' (operation S1206: No), the learning device 100 moves onto the processing of operation S1208. On the other hand, in the case where the generation probability of the summary y as a correct answer is higher than the generation probability of the new summary y' (operation S1206: Yes), the learning device 100 moves onto the processing of operation S1207.

In operation S1207, the learning device 100 updates the parameters of the model on the basis of the input article x and the summary y as a correct answer (operation S1207). Then, the learning device 100 moves onto the processing of operation S1208.

In the operation S1208, the learning device 100 determines whether all the training data have been selected from the training data group (operation S1208). Here, in the case where unselected training data remains (operation S1208: No), the learning device 100 returns to the processing of operation S1201. On the other hand, in the case where all the training data have been selected (operation S1208: Yes), the learning device 100 terminates the learning processing. As a result, the learning device 100 obtains the model capable of accurately generating a summary sentence.

Estimation Processing Procedure

Next, an example of an estimation processing procedure executed by the learning device 100 will be described with reference to FIG. 13. The estimation processing is implemented by, for example, the CPU 301, the storage area of the memory 302, the recording medium 305, or the like, and the network I/F 303 illustrated in FIG. 3.

Figure 13:
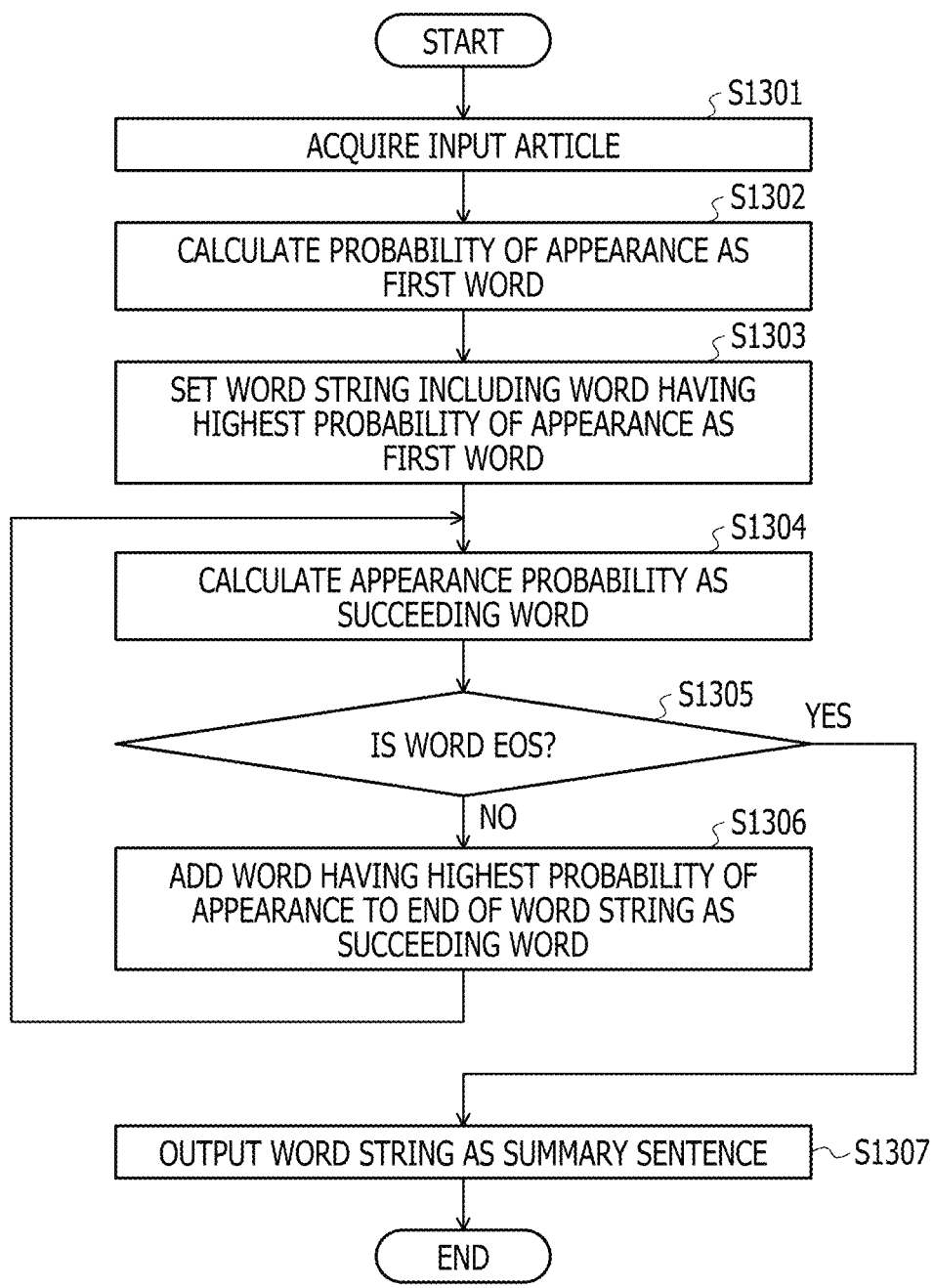
FIG. 13 is a flowchart illustrating an example of an estimation processing procedure.

FIG. 13 is a flowchart illustrating an example of an estimation processing procedure. The learning device 100 acquires an input article (operation S1301).

Next, the learning device 100 calculates a probability of appearance as the first word in the summary for each of the plurality of words on the basis of the input article, using the model (operation S1302). Then, the learning device 100 sets a word string including the word having the highest calculated probability of appearance as the first word (operation S1303).

Next, the learning device 100 calculates a probability of appearance as a succeeding word in the summary for each of the plurality of words on the basis of the current word string, using the model (operation S1304). Then, the learning device 100 determines whether the word having the highest calculated probability of appearance is EOS (operation S1305).

Here, in the case of EOS (operation S1305: Yes), the learning device 100 moves onto the processing of operation S1307. On the other hand, in the case of not EOS (operation S1305: No), the learning device 100 moves onto the processing of operation S1306.

In the operation S1306, the learning device 100 adds the word having the highest calculated probability of appearance to the end of the word string as the succeeding word (operation S1306). Then, the learning device 100 returns to the processing of operation S1304.

In operation S1307, the learning device 100 outputs the word string as a summary sentence (operation S1307). Then, the learning device 100 terminates the estimation processing. As a result, the learning device 100 accurately generates and make available the summary sentence corresponding to the input article.

Here, the learning device 100 may execute the processing of some operations in each of the flowcharts of FIGS. 12 and 13 in a different order. For example, the order of the processing of operation S1202 and the processing of operations S1203 to S1205 may be switched.

As described above, according to the learning device 100, the first input sentence and the first summary sentence that summarizes the first input sentence can be acquired. According to the learning device 100, the second summary sentence that is a partially-changed version of the acquired first summary sentence can be generated. According to the learning device 100, the model may be learned such that the first probability of generating the first summary sentence in response to the input of the first input sentence becomes higher than the second probability of generating the second summary sentence in response to the input of the first input sentence. Thereby, the learning device 100 uses the model capable of accurately generating the summary sentence corresponding to the input sentence.

According to the learning device 100, the probability that each of a plurality of words appears in the summary sentence corresponding to the first input sentence may be calculated using the model. According to the learning device 100, the first probability and the second probability may be calculated on the basis of the calculated probability, and the model may be updated on the basis of the first input sentence, the first summary sentence, and the second summary sentence when the calculated first probability is higher than the calculated second probability. Thereby, the learning device 100 calculates the probability of generating the summary sentence in units of summary sentence, using the probability that each of a plurality of words appears.

The learning device 100 generates the second summary sentence that is partially similar to the first summary sentence. Thereby, the learning device 100 makes the inappropriate summary sentence, which is a negative example, available for training the model. Furthermore, the learning device 100 generates the second summary sentence likely to be considered inappropriate for the first input sentence from the viewpoint of the viewer as a negative example, by generating the second summary sentence having a specific word such as a person name or a proper noun different from the first summary sentence. Therefore, with the trained model, the learning device 100 reduces the probability of generating an inappropriate summary sentence.

According to the learning device 100, the second summary sentence may be generated by changing the numerical value included in the first summary sentence with another numerical value. Thereby, the learning device 100 makes the inappropriate summary sentence, which is a negative example, available for training the model. Furthermore, the learning device 100 generates the second summary sentence likely to be considered inappropriate for the first input sentence from the viewpoint of the viewer as a negative example, by changing a specific word. Therefore, with the trained model, the learning device 100 reduces the probability of generating an inappropriate summary sentence.

According to the learning device 100, another training data may be searched for a summary sentence partially similar to the first summary sentence as the second summary sentence by randomly selecting a word included in the first summary sentence and hiding the selected word. Alternatively, the learning device 100 searches the another training data for a summary sentence partially similar to the first summary sentence as the second summary sentence by randomly selecting a word included in the first summary sentence and setting a sentence in which the selects word is hidden as the search condition. Thereby, the learning device 100 makes the inappropriate summary sentence, which is a negative example, available for training the model.

According to the learning device 100, the summary sentence corresponding to the target input sentence may be generated using the learned model. Thereby, the learning device 100 accurately generates the summary sentence corresponding to the input sentence.

According to the learning device 100, the model may be implemented by the neural network. As a result, the learning device 100 implements the model without manually formulating the model.

Note that the learning method described in the present embodiment may be implemented by executing a prepared program on a computer such as a personal computer (PC) or a workstation. The learning program described in the present embodiment is executed by being recorded on a computer-readable recording medium and being read from the recording medium by the computer. The recording medium is a hard disk, a flexible disk, a compact disc (CD)-ROM, a magneto-optical disc (MO), a digital versatile disc (DVD), or the like. Furthermore, the learning program described in the present embodiment may be distributed via a network such as the Internet.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a learning program that causes a computer to execute a process, the process comprising:
    acquiring a first input sentence and a first summary sentence into which the first input sentence is summarized;
    generating a second summary sentence to which the first summary sentence is partially-changed; and
    executing machine learning for a model to generate at least one summary sentence that corresponds to at least one input sentence, respectively, in response to an input of the at least one input sentence, such that a first probability of generating the first summary sentence in response to the input of the first input sentence becomes higher than a second probability of generating the second summary sentence in response to the input of the first input sentence, based on the first input sentence, the first summary sentence, and the second summary sentence.

2. The non-transitory computer-readable recording medium according to claim 1,
    wherein the model is capable of calculating a probability that each of a plurality of words appears in the at least one summary sentence, and is capable of generating the at least one summary sentence, based on the calculated probability, and
    wherein the machine learning includes:
    calculating a third probability with which each of a plurality of words appears in the first summary sentence, and calculating the first probability and the second probability, based on the third probability, with the model, and
    updating the model based on the first input sentence, the first summary sentence, and the second summary sentence in a case where the first probability is higher than the second probability.

3. The non-transitory computer-readable recording medium according to claim 1,
    wherein the process generates the second summary sentence by randomly selecting a named entity that appears in the first summary sentence, by masking the named entry, and by searching a training data group for the at least one summary sentence partially similar to the first summary sentence that includes the masked named entry.

4. The non-transitory computer-readable recording medium according to claim 1,
    wherein the process generates the second summary sentence by changing a numerical value included in the first summary sentence to another numerical value.

5. The non-transitory computer-readable recording medium according to claim 1,
    wherein the process generates the second summary sentence by randomly selecting a word included in the first summary sentence and by changing the word to another word other than the selected word.

6. The non-transitory computer-readable recording medium according to claim 1,
    wherein the at least one summary sentence that corresponds to a target input sentence is generated by using the model.

7. The non-transitory computer-readable recording medium according to claim 1,
    wherein the model is a neural network.

8. A learning method that causes a computer to execute a process, the process comprising:
    acquiring a first input sentence and a first summary sentence into which the first input sentence is summarized;
    generating a second summary sentence to which the first summary sentence is partially-changed; and
    executing machine learning for a model to generate at least one summary sentence that corresponds to at least one input sentence, respectively, in response to an input of the at least one input sentence, such that a first probability of generating the first summary sentence in response to the input of the first input sentence becomes higher than a second probability of generating the second summary sentence in response to the input of the first input sentence, based on the first input sentence, the first summary sentence, and the second summary sentence.

9. A learning device comprising:
    a memory; and
    a processer coupled to the memory and configured to:
    acquire a first input sentence and a first summary sentence into which the first input sentence is summarized;
    generate a second summary sentence to which the first summary sentence is partially-changed; and
    execute machine learning for a model to generate at least one summary sentence that corresponds to at least one input sentence, respectively, in response to an input of the at least one input sentence, such that a first probability of generating the first summary sentence in response to the input of the first input sentence becomes higher than a second probability of generating the second summary sentence in response to the input of the first input sentence, based on the first input sentence, the first summary sentence, and the second summary sentence.

* * * * *